(12) United States Patent
Kuerner et al.

(10) Patent No.: US 10,173,747 B2
(45) Date of Patent: Jan. 8, 2019

(54) QUICK RELEASE THROUGH AXLE WITH LOCKING ELEMENTS FOR BIKES

(71) Applicant: Ulrich Fahl, Schliengen (DE)

(72) Inventors: Denis Kuerner, Kirchzarten (DE); Wolfgang Heer, Teningen (DE); Ingo Beutner, Gemuenden (DE); Nico Schlereth, Aschach (DE)

(73) Assignee: Ulrich Fahl, Schliengen (DE)

( * ) Notice: Subject to any disclaimer, the term of this patent is extended or adjusted under 35 U.S.C. 154(b) by 0 days.

(21) Appl. No.: 15/225,266

(22) Filed: Aug. 1, 2016

(65) Prior Publication Data

US 2017/0066497 A1   Mar. 9, 2017

(30) Foreign Application Priority Data

Aug. 5, 2015 (DE) .................... 20 2015 005 524 U
Dec. 7, 2015 (DE) ........................ 10 2015 121 218
May 19, 2016 (DE) .................... 20 2016 102 676 U (51) Int. Cl.
*B62K 25/02* (2006.01)
*B60B 27/02* (2006.01)

(52) U.S. Cl.
CPC ............ *B62K 25/02* (2013.01); *B60B 27/026* (2013.01); *B62K 2206/00* (2013.01)

(58) Field of Classification Search
CPC .... B60B 27/026; B62K 2206/00; B62K 25/02
See application file for complete search history.

(56) References Cited

U.S. PATENT DOCUMENTS

| 7,090,308 B2* | 8/2006 | Rose .................... B62K 25/02 |
| | | 301/110.5 |
| 7,494,145 B2* | 2/2009 | Schroeder ............ B60B 27/026 |
| | | 280/276 |
| 7,735,937 B2* | 6/2010 | Chonan .................. B62K 25/02 |
| | | 301/124.2 |

(Continued)

FOREIGN PATENT DOCUMENTS

| AU | 2014271226 | 6/2015 |
| DE | 512198 | 11/1930 |

(Continued)

OTHER PUBLICATIONS

102015121218.8 German Search Report dated Jun. 3, 2016.

*Primary Examiner* — Kip T Kotter
(74) *Attorney, Agent, or Firm* — Wagenknecht IP Law Group, PC (57) ABSTRACT

A quick-clamping system for fixing the hub of a wheel between dropouts of a fork or chainstays of a bicycle having a tension axle (1) with a means for exerting axial compressive forces (3) and a first clamping surface (4), both being arranged at a first end (2); a locking mechanism (6) having a second clamping surface (7) and blocking a second end (5) against axial motion; a counter piece (8), wherein counter piece (8) and second end (5) can be detachably connected by means of axial plugging, and wherein the counter piece (8) has an axially moveable, operable unlocking mechanism (9) by means of which the locking mechanism (6) can be unlocked, so that counter piece (8) and second end (5) can be detached from each other.

17 Claims, 6 Drawing Sheets

(56) References Cited

U.S. PATENT DOCUMENTS

| | | | | |
|---|---|---|---|---|
| 8,113,594 B2* | 2/2012 | Jones | B60B 27/026 | |
| | | | 280/279 | |
| 8,382,134 B2* | 2/2013 | Bartlett | B62K 25/02 | |
| | | | 280/279 | |
| 9,340,251 B2* | 5/2016 | Thompson | B62K 15/008 | |
| 9,493,034 B1* | 11/2016 | Ueda | B60B 27/026 | |
| 2012/0161503 A1* | 6/2012 | Achenbach | B62K 25/02 | |
| | | | 301/124.2 | |
| 2015/0158546 A1* | 6/2015 | Scholz | B62K 25/02 | |
| | | | 301/124.2 | |
| 2016/0031521 A1* | 2/2016 | Voss | B62K 25/02 | |
| | | | 301/124.2 | |

FOREIGN PATENT DOCUMENTS

| | | |
|---|---|---|
| DE | 102008012573 | 6/2009 |
| GB | 2414971 | 12/2006 |
| WO | 2008/145497 | 12/2008 |
| WO | 2009/153038 | 12/2009 |

* cited by examiner

QUICK RELEASE THROUGH AXLE WITH LOCKING ELEMENTS FOR BIKES

CROSS REFERENCE TO RELATED APPLICATIONS

This application claims benefit of priority to German patent application no. 20 2016 102 676.8, filed May 19, 2016, German patent application no. 10 2015 121 218.8, filed Dec. 7, 2015, and to German patent application no. 20 2015 005 524.9, filed Aug. 5, 2015. The content of the preceding documents is herein incorporated by reference in its entirety.

TECHNICAL FIELD

The invention relates to the area of wheel axles for bicycles. In particular, the invention relates to a wheel axle for a bicycle which is designed as a thru axle, having a quick-release mechanism.

BACKGROUND OF THE INVENTION

Typically, wheels for two-wheeled vehicles such as e.g. bicycles or motorcycles consist of a tire which is mounted onto a rim, and a hub which is arranged in the center of the wheel. Rim and hub are connected to each other by means of spokes or discs. The hub itself comprises a hub body, with the spokes or discs being attached to its outside, and an internally arranged axis, around which the hub body which usually runs on ball bearings can rotate freely.

The axis is connected to the bicycle by attaching its two ends, with the hub body in between, to the dropouts of the fork or the chainstays. Thus, one part of the wheel (the axis) is firmly attached to the frame, while another part (hub body with rim) can rotate.

For the fixation of the hub between the dropouts, various constructions are known.

Simple solutions provide a solid axle which runs through the hub, having threads on both ends. Further, the solid axle has shoulders, fabricated by turning or provided by counter-nuts, which lie flat against the inner sides of the dropouts. The dropouts are clamped between outside nuts and the respective shoulder by means of tightening these outside nuts, so that the desired fixation is achieved. A disadvantage of these solutions is the often heavy weight, together with the time requirement for detachment using a tool. By using wing nuts, it is possible to omit the necessity to carry along a tool when travelling; however, the risk of injury is higher then since the wing nuts laterally extend from the axle region.

In order to decrease the time necessary for attaching or detaching the hub, so called quick-release systems are known from the art. As a main component, these systems provide a usually rather thin, internally arranged tension axle, with a clamping lever with eccentric cam being attached to its one end. In direction to the hub, a pressure disc lies flat against the eccentric cam, the pressure disc providing a first clamping surface that points towards the dropout. At the second end, a thread is present onto which a counter piece can be screwed. The counter piece provides a second clamping surface which is directed contrary to the first clamping surface. By turning the clamping lever, the pressure disc is pushed in direction of the second end. Both clamping surfaces approach each other. Since they lie flat against the outsides of the dropouts, and since a fixed hollow axle of the hub through which the tension axle can be inserted is arranged between the dropouts, the hollow axle is clamped between the inner sides of the dropouts. For declamping, the opposite steps are carried out. For detachment of the hub, the dropouts usually have slot-like recesses which point downwards, so that the tension axle can remain in the hollow axle when the wheel is removed. In other cases (when having bores in the dropouts), the tensile axle must be pulled out of the hollow axle after having released the counter piece.

In cases when the stability of the fork or the chainstays must be exceptionally high, e.g. when using suspension forks or rear suspensions, said bores are preferred to slot-like recesses. The then called thru axles are inserted through the opening in the first dropout, the hollow axle of the hub, and eventually through the opening of the second dropout. Finally, a fixation is necessary. In the simplest case, this occurs by screwing a counter piece onto the second end of the axle, or by providing a thread inside the bore of the second dropout into which the thru axle can be screwed with its second end. However, this practice is time consuming and therefore particularly disadvantageous in the racing domain where shortest possible exchange times are most desirable.

Therefore, quick release systems are known also for said thru axles which shall allow for a tool-free and quick fixation and detachment of the wheel.

In document GB 2 414 971 A, a quick release system is disclosed which has a locking mechanism of the bayonet catch type at its second end. By rotating the thru axle around its longitudinal axis, e.g. for 90 degrees, the second end is locked in the counter piece; by a contrary rotation, it is unlocked again. A comparable construction is disclosed in document AU 2014271226 A1. If, however, the opening in the counter piece soils, which is particularly common in mountain biking, the operability of the locking mechanism can be limited. Further, the construction of a bayonet catch does require that axle and counter piece are inserted one into the other in a certain position in order to allow for interlocking. Usually, this position is found out by trial which is time consuming. Markers that are provided for finding the correct position can easily be soiled and thus become poorly visible.

Another solution is proposed in document WO 2009 153 038 A1. Here, the thru axle does not require a counter piece, but contains all components which are relevant for the functioning. It has a multiple slotted region at its second end, which is expandable by axial tensioning. The tensile forces are provided by means of turning the lever and via a tensile axle which is guided through the hollow axle. In the expanded state, the second end does not fit through the opening of the according dropout any more, so that clamping of the hollow axle between the inner sides of the dropouts is enabled. The expandable region can also be present at both ends of the thru axle, as disclosed in document US 2005/0110335 A1.

A comparable and also single piece solution is disclosed in document US 2009/140571 A1. Here as well, a wreathlike region is present which, in the basic state, extends over the diameter of the thru axle, therefore preventing the axle from being pulled out of the second dropout, but providing the second clamping surface instead. Upon compression with an end sleeve, this region is reduced in its diameter down to the diameter of the thru axle, so that then, a pulling out of the dropouts and the thru axle of the hub becomes possible. Here, it is necessary that the inner diameter of the openings of the dropouts as well as the diameter of the hollow axle of the hub remain approximately similar. If the diameter would increase, the wreathlike region would fan out again, since compression becomes impossible when the region, and with it, the end sleeve, are unreachable from the outside. In order to circumvent this problem, the sleeve can be fixed in the compressed state by means of rotation; then, the wreathlike region keeps the reduced diameter. However, adjusting the correct rotation angle which results in a fixation requires certain finesse. Further, the mechanics which is used for the fixation is sensitive to soiling. Also, the inner construction is rather complicated.

SUMMARY OF THE INVENTION

Thus, the invention has the object of providing a quick release system for thru axles which can be operated in an easy and secure way. Further, it shall be unsusceptible to soiling, and it shall provide a most simple construction.

The quick-clamping system serves for fixing the hub of a wheel between the dropouts of the fork or the chainstays of a bicycle. It is clear that the invention can also be used on vehicles such as e.g. recumbent bikes, delivery bikes, or bikes for disabled persons, all having more than two wheels.

Firstly, the quick-clamping system comprises a tension axle. The tension axle is suitable for absorbing tensile forces which are introduced between its both ends. Further, it is preferably able to absorb—at least minor—compressive forces as well, because otherwise, it would be difficult to insert it into the according openings of the dropouts and the hollow axle of the hub.

At a first end of the tension axle, a "means for exerting axial compressive forces" is arranged. Accordingly, this means has the function of providing compressive forces which are necessary for clamping the hub. Typically, this means is a lever with eccentric cam. Alternatively, the means can also be designed as a screw-in part, or it can be connectable in a bayonet-like manner with the tension axle. Then, the tension process is not carried out by turning a lever, but by rotating the screw-in part. Essential is only that said compressive forces can be provided by the means. Typically, these forces result from an axial displacement of a towards the dropout pointing outside of the means.

Presently, this outside is called "first clamping surface". The first clamping surface can e.g. be part of the aforementioned eccentric cam. It can also be that side of a pressure disc which points towards the dropout. It is then preferred that such a pressure disc consists of a material on which the possibly present eccentric cam can slide well, and it is adapted to the shape of the eccentric cam. On the other side, the pressure disc is typically flat or conical shaped, wherein the surface can be smooth or corrugated, for instance.

It is clear that a corresponding second clamping surface must exist which can accept the tensile forces that act onto the tension axle in the operational state, thus exerting compressive forces onto the second dropout. This second clamping surface is provided by a component which is integrated into the tension axle. The distance between both adjacent clamping surfaces is reduced by operating the means for exerting axial compressive forces. Between the clamping surfaces, the dropouts (or support areas thereof) are arranged. So, clamping forces can be exerted onto the dropouts.

At the second end of the tension axle, a "locking mechanism" is arranged which is blocking against relative axial motion of the tension axle and (directly or indirectly) the second dropout. This locking mechanism also provides the second clamping surface. The locking mechanism has the task of establishing a mechanical connection, at least capable of absorbing tensile forces, with a further part.

This further part is presently called "counter piece". It can be designed as an entirely separate component, or it can be fitted into the region of the opening of the dropout, or it can be integrated there as well. In other words, the counter piece can, but must not, be present as an individual body which is separated from the dropout.

According to the invention, counter piece and second end can be detachably connected by means of axial plugging or inserting (and not screwing). This means that the present connection is of the plug connector, and not the screw- or bayonet connector type, as known in the art. Inter alia, a plug connector has the advantage that it can be established as well as detached significantly faster. Further, it can easily be constructed in a way that it is less susceptible to soling.

Here, "detachably" means that during normal operation, the connection can be opened and closed; and preferably, without tool. Accordingly, "detachably" must be distinguished from "demountable"; an only "demountable" connection is permanently closed (connected) during operation, and opened only for initial set up or for maintenance purposes. For this, a tool is typically necessary as well. Also, this "detaching" by means of demounting does not serve for the simplified removing of a wheel.

According to the invention, the counter piece comprises also an unlocking mechanism by means of which the locking mechanism can be unlocked, so that counter piece and second end are detached from each other. In other words, second end and counter piece can be detached from each other by operating the unlocking mechanism. However, for connecting both components, they are simply inserted one into the other. For this, operation of the unlocking mechanism is not necessary.

Such a construction allows for very quick and simple mounting of a wheel in the fork or the chainstays of a bicycle. The hub is positioned between the inner sides of the dropouts. The means for exerting axial compressive forces (typically a clamping lever) is opened, the tension axle is inserted through the opening of the first dropout, the hollow axle of the hub, and the opening of the second dropout. Inside or behind the second dropout, the counter piece with the locking mechanism is placed. The tension axle is anchored with its second end in the counter piece by way of plugging or insertion; a rotation or any kind of positioning of the axle is not necessary. By way of operating the means for exerting axial compressive forces, compressive forces are exerted onto the first clamping surface which propagate through the tension axle as tensile forces, and which are eventually dissipated via the second clamping surface into the second dropout, since this surface directly or indirectly rests on the second dropout. The compressive forces which act on both outsides of the dropouts press them together; between the inner sides of the dropouts, the hollow axle of the hub is arranged. Thus, a closed force flow is established. As a result, the hub is clamped, the wheel is attached.

In the opposite case, i.e. for detaching the wheel, at first, the means for exerting axial compressive forces is opened. Thus, the tension axle is not under tensile stress any more, the clamping surfaces are relieved. Now, the mechanical connection between counter piece and tension axle is opened by way of operating the unlocking mechanism in the counter piece. Then, the tension axle can simply be pulled out of the second dropout, the hollow axle, and eventually the first dropout. Now, the hub can easily be detached from the fork or the chainstays, respectively.

Thus, a quick release system is provided which can be operated in an easy and secure way, since the steps which are necessary for its use can be carried out in a simple manner and do not require any cumbersome positioning of the components. It is further insusceptible to soiling, since it can be constructed in a simple way, thus further saving production and assembly costs on one hand, and helping to reduce weight on the other.

BRIEF DESCRIPTION OF THE DRAWINGS

In the following, the invention is disclosed in more detail by means of exemplary embodiments with the aid of the figures.

DETAILED DESCRIPTION

Figure 1:
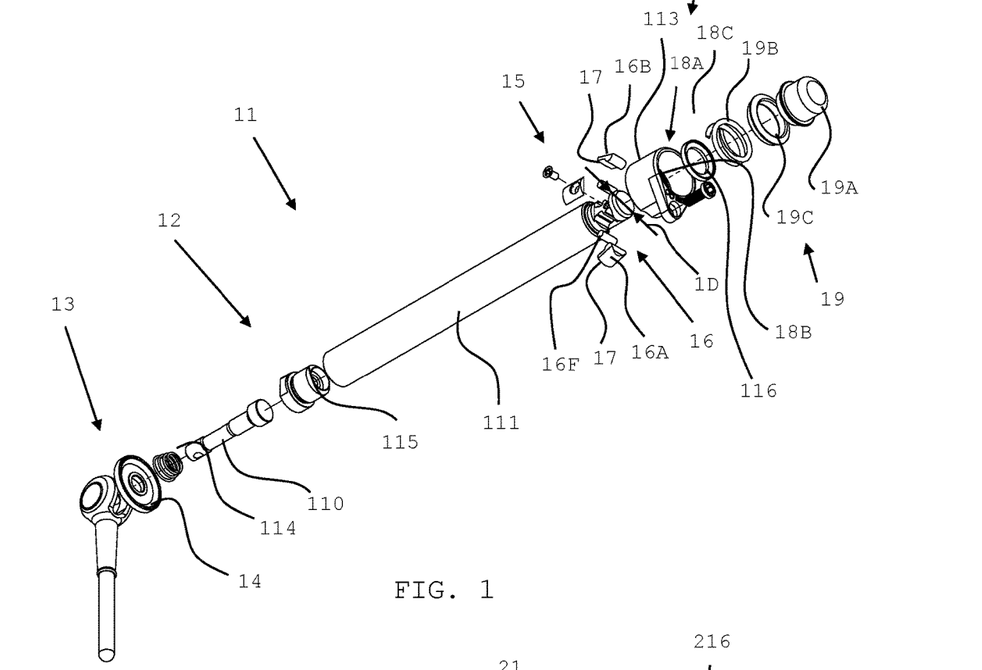
FIG. 1 shows an exploded view of a first embodiment of the quick release system according to the invention.

In FIG. 1, an exploded view of a first embodiment of the quick release system according to the invention is shown. At the left, first end 12, at the right, second end 15 is visible. At first end 12, the means for exerting axial compressive forces 13 is arranged, presently being designed as clamping lever with eccentric cam and separate pressure disc. Means 13 is connected via a tension rod 110 to the middle section 111 of the tension axle 11. Of course, means 13 can also be directly attached to the middle section 111. At the second end 15, at the right, the locking mechanism 16 is arranged.

Particularly preferred, the locking mechanism comprises locking pawls. Presently, these are locking pawls 16A, 16B. The edges which point towards the first clamping surface 14 form the (here two-part) second clamping surface 17. In the operational state (axle locked), these edges laterally project above diameter 1D of second end 15 (see also next figure). They rest on a shoulder 18B which is present in counter piece 18.

Figure 2:
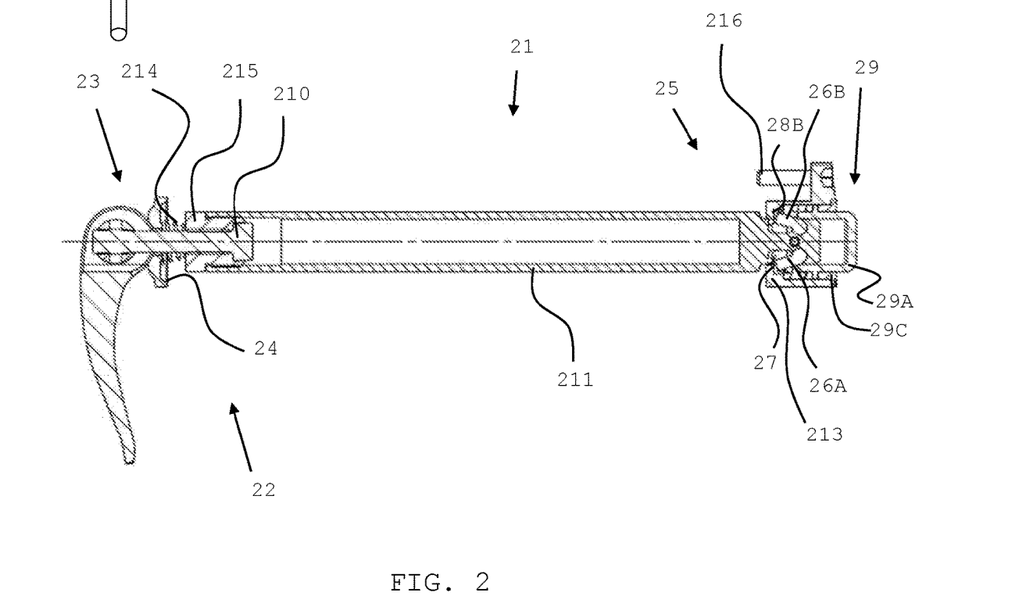
FIG. 2 shows an assembly of the embodiment of FIG. 1 as longitudinal cut view.

In FIG. 2, an assembly of the embodiment of FIG. 1 is shown as longitudinal cut view, with a differently formed, but identically functioning clamping lever. Well visible is the hollow middle section 211 of tension axle 21. Also visible are the swung out locking pawls 26A, 26B, which rest against shoulder 28B of counter piece.

Figure 3:
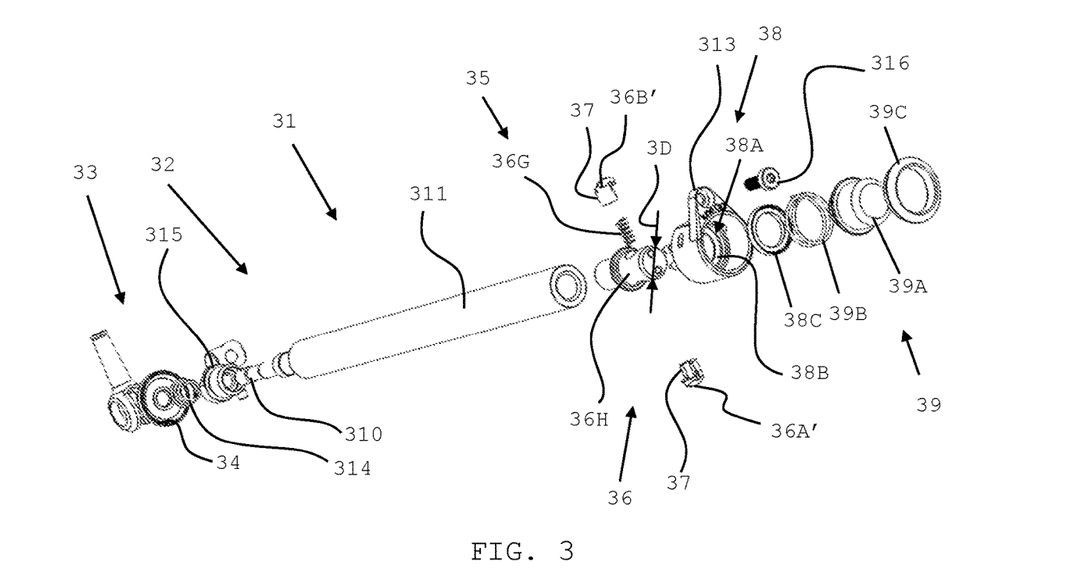
FIG. 3 shows an exploded view of a further embodiment of the quick release system according to the invention.

In FIG. 3, an exploded view of a further embodiment of the quick release system according to the invention is shown.

According to this embodiment, the locking mechanism comprises locking sliders. Presently, these are locking sliders 36A', 36B'. The surfaces which point towards the first clamping surface 34 to form the (here two-part) second clamping surface 37. In the operational state (axle locked), these edges laterally project above diameter 3D of second end 35 (see also next figure). They rest on a shoulder 38B which is present in counter piece 38.

Figure 4:
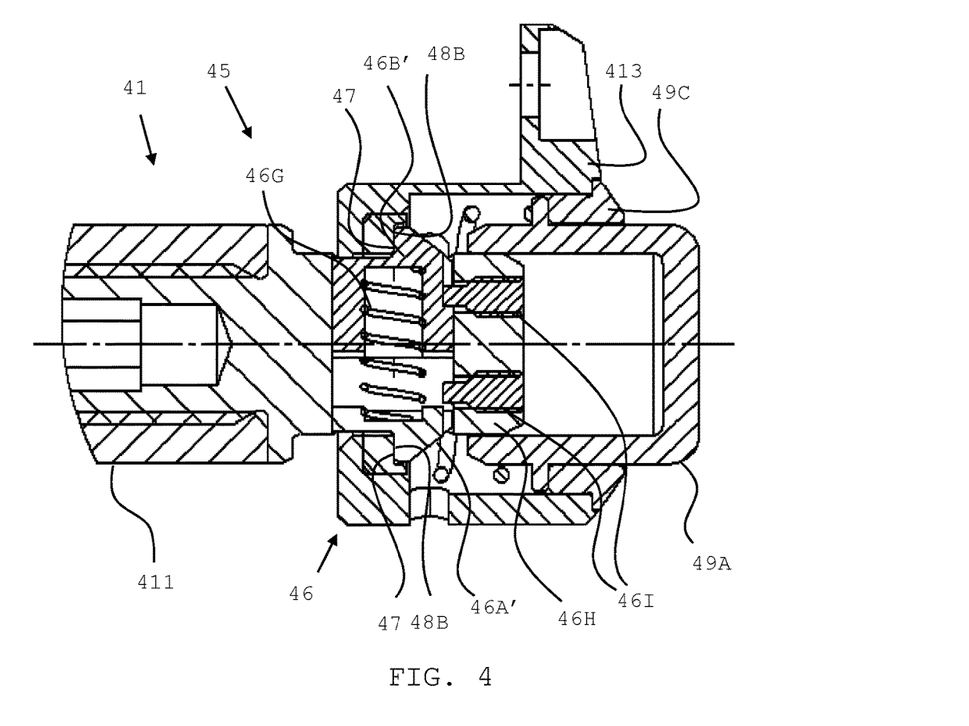
FIG. 4 shows a part of the assembly of the embodiment of FIG. 3 as longitudinal cut view.

In FIG. 4, a detail of the assembly of the embodiment of FIG. 3 is shown as longitudinal cut view. Well visible is the end of the hollow middle section 411 of tension axle 41. Also visible are the swung out locking sliders 46A', 46B', which rest against shoulder 48B of counter piece.

Figure 5:
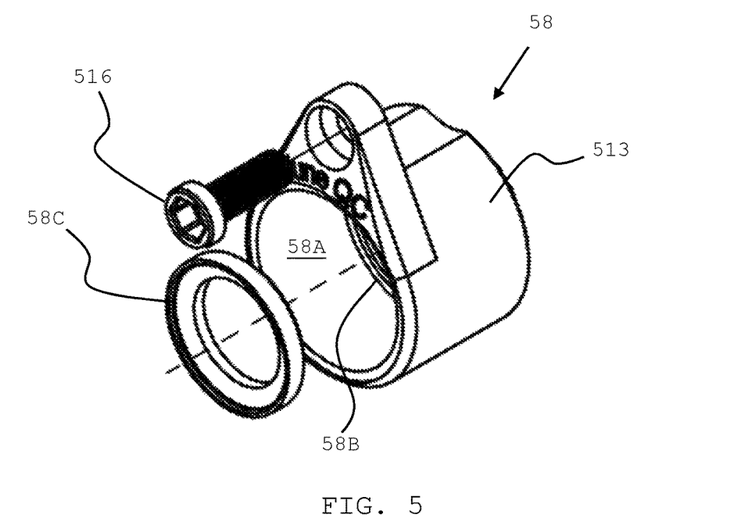
FIG. 5 shows parts of the counter piece of FIG. 1 and FIG. 3.
Figure 6:
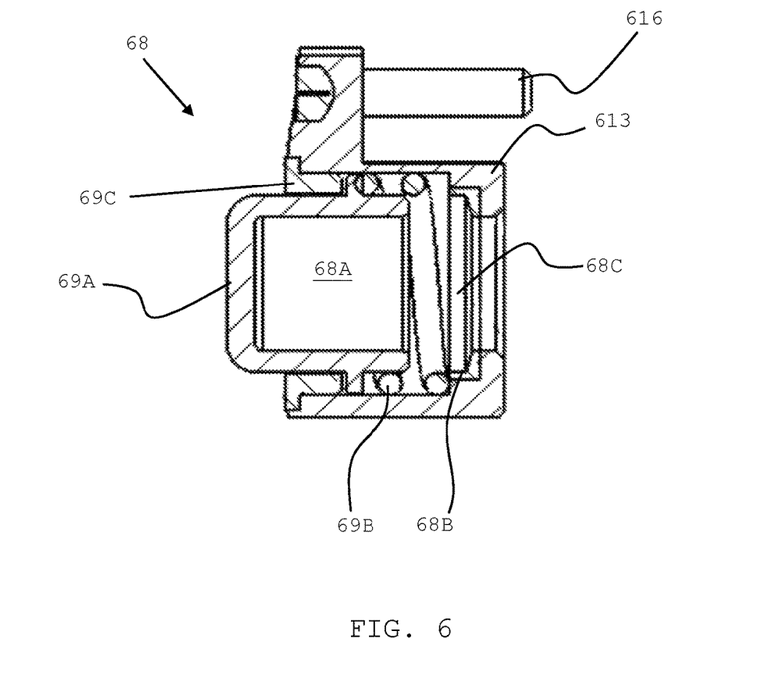
FIG. 6 shows a cut view of the counter piece.

FIG. 5 and FIG. 6 show parts of counter piece 58, 68 according to the embodiment of FIG. 1 and FIG. 3. The depicted optional screw serves as safeguard for the counter piece 58, 68 in the dropout (not shown).

Figure 7:
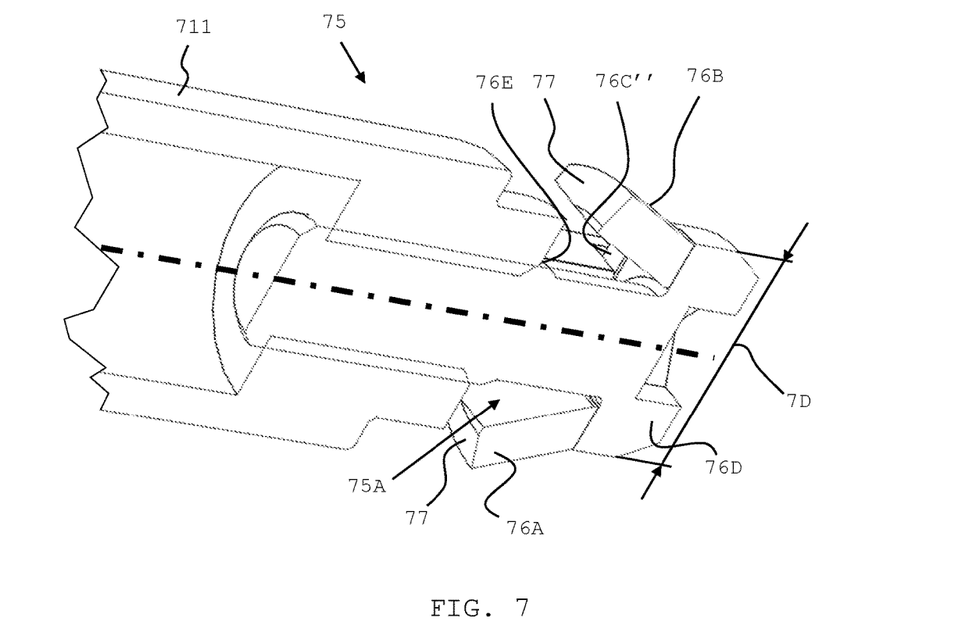
FIG. 7 shows a detail view of a cut through an embodiment of the second end.

In FIG. 7, a detail view of a cut through a further embodiment of the second end 75 with locking pawls 76A, 76B is shown. For reasons of clarity, hatching is omitted. This embodiment of locking mechanism is characterized by a particularly simple construction. Both locking pawls 76A, 76B are connected with each other by means of common fillets (only fillet 76C" visible, the other one lies in above the sheet level), and they are preferably fabricated in one piece. Thus, installation of the locking pawls 76A, 76B is particularly simple. They are plugged onto a bolt 76D having an internal hex, which is then screwed into the second end 75 of the middle section 711 until a shoulder 76E. Locking pawls 76A, 76B are fabricated such that they are swung out in the unloaded state. Recess 75A at the second end 75 is dimensioned such that the outsides of the locking pawls 76A, 76B are completely flush with the shell surface of the second end 75 when in the swung in position. They do no project above diameter 7D.

As shown in the according previous embodiments, it is preferred that locking pawls 76A, 76B laterally spring out of the second end 75 and act in direction of the first clamping surface 74.

Figure 8:
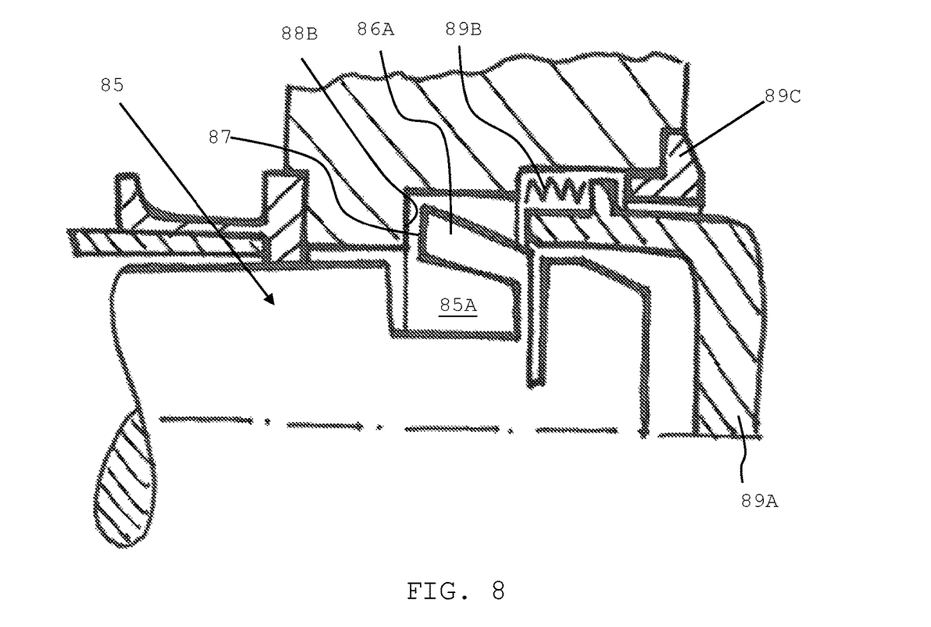
FIG. 8 shows a detail view of a cut through a further embodiment of the second end with counter piece.

Such an embodiment is e.g. shown in FIG. 8. According to this embodiment, locking pawls (only one pawl 86A shown) are fabricated integrally with the second end 85. In order to achieve a sufficient flexibility, an additional radial slit (cut-in, no reference numeral) can be provided, as shown. Recess 85A at second end 85 is also directly formed therein.

The advantage of this embodiment is in the lowest possible number of individual parts for locking mechanism.

According to the embodiment shown in FIG. 1, the locking pawls 16A, 16B can also be present in several parts and swivel-mounted in the second end 15.

According to the embodiment shown in FIG. 7, they are fabricated as a continuous component.

Figure 9:
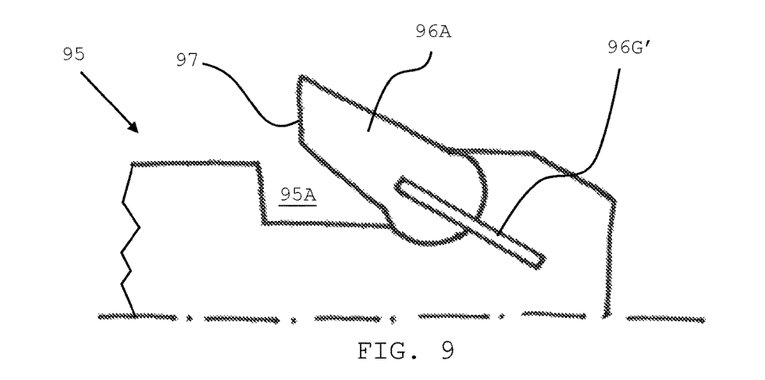
FIG. 9 shows a detail view of a cut through a further embodiment of the second end.

The locking pawls can be kept in the swung out position by means of integrated springs (FIG. 7, FIG. 8), by means of elastomers (FIG. 1, FIG. 2), or by means of inserted spring leafs 96G' (FIG. 9).

Referencing again to FIG. 3 which shows an embodiment with locking sliders 36A', 36B', it is preferred for such embodiments that locking sliders 36A', 36B' can laterally move out of the second end 35 and act (with their second clamping surfaces 37) in direction of the first clamping surface 34. In this context, "moving out" means any kind of pushing out, swinging out, or springing out; it is essential that a section of the locking sliders 36A', 36B' can be arranged both inside the envelope of the second end 35 or the middle section 311 of the tension axle 31, as well as outside of this envelope.

Particularly preferred, the locking mechanism comprises exactly two locking sliders as shown in FIG. 3 (36A', 36B') and FIG. 4 (46A', 46B'). The advantage of such a construction can be seen the low number of parts and the comparatively large second clamping surface.

According to another embodiment, the locking mechanism comprises three, four or more locking sliders. Also, the construction with a single locking slider is possible. It is further preferred that the angle between the locking sliders, measured in direction of the longitudinal axis of tension axle, is always the same (e.g. 180 degrees for two locking sliders, 120 degrees for three locking sliders, and so on).

Figure 10:
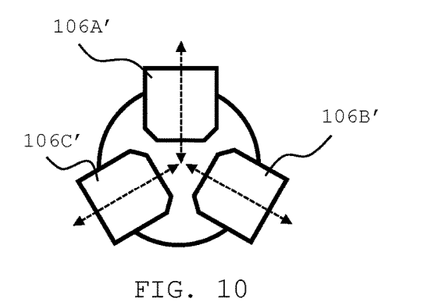
FIG. 10 shows a view of a locking mechanism with exactly three symmetrically arranged locking sliders.

In FIG. 10, an axially oriented view of a locking mechanism with exactly three symmetrically arranged locking sliders 106A', 106B', 106C' is depicted. Here, three locking sliders 106A', 106B', 106C' are evenly distributed around the circumference; thus, the angle between the motion axis of the locking sliders 106A', 106B', 106C' amounts to 120 degrees.

Figure 11:
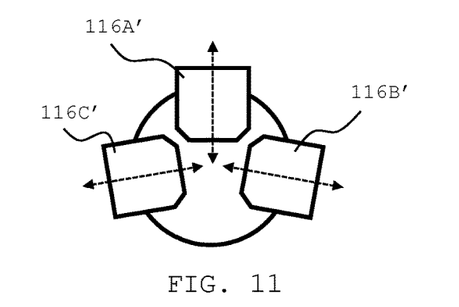
FIG. 11 shows a schematic view of a locking mechanism with exactly three asymmetrically arranged locking sliders.

In FIG. 11, an asymmetric embodiment with three locking sliders 106A', 106B', 106C' is depicted. It may be a constructional advantage to have a region of more than 120 degrees with no locking slider; in the depicted case, the large angle amounts to approx. 160 degrees, and the two smaller angles amount to approx. 100 degrees.

Figure 12:
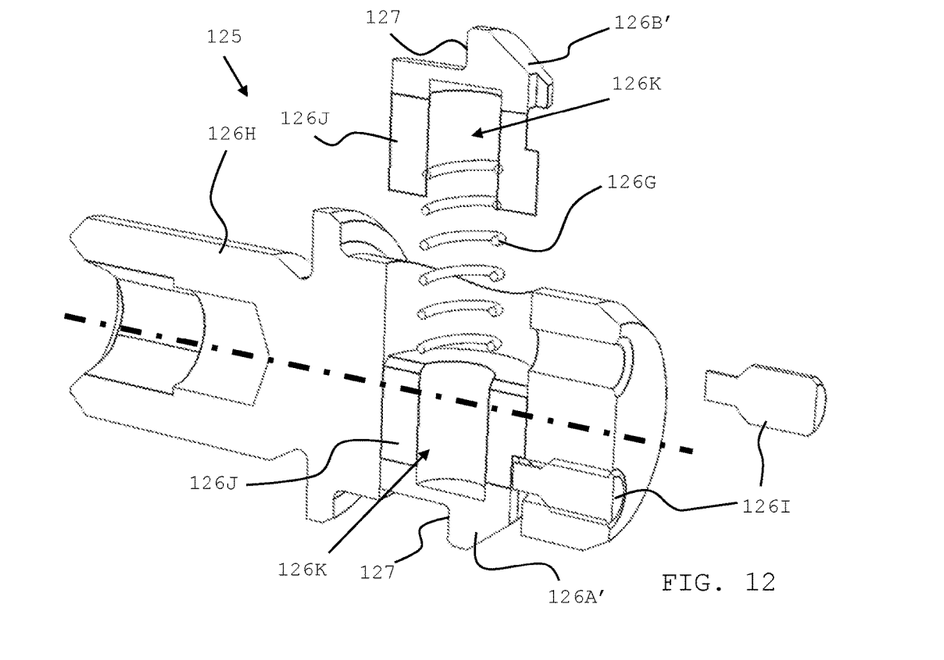
FIG. 12 shows a detail view of a cut through an embodiment of the housing with locking sliders.

In FIG. 12, the detail of a preferred embodiment of the second end 125 with locking sliders is shown as a cut view. Presently, both locking sliders 126A', 126B' are pushed radially outwards by a pressure spring (spring 126G), and they are secured by threaded bolts (headless screw 126I) against falling out or rotating, respectively. Thus, locking sliders 126A', 126B' move along a common linear axis. According to the depicted embodiment, they have a pot-shaped basic shape. Both openings of this basic shape point towards each other. Spring 126G plunges with its both ends in these two openings, thus pushing both locking sliders 126A', 126B' away from each other. Locking sliders 126A', 126B' are guided by according boreholes of the housing 126H which holds them. Presently, they are secured there against falling out by means of headless screws 126I. The latter engage in an according recess of locking sliders 126A', 126B'.

In order to achieve a sufficient overall length and thus, stability as well as the possibility of guiding locking sliders 126A', 126B' in the housing 126H on one hand, but to keep the diameter of housing 126H and thus, of tensile axle 121, as low as possible on the other hand, both (preferably identically designed) locking sliders 126A', 126B' can be partially inserted one into the other with their back sides which face one another. For this, each locking slider 126A', 126B' can provide in its region which points towards spring 126G (and therefore, towards the adjacent locking slider 126A', 126B') an opening 126K into which the according region of the corresponding locking slider 126B', 126A' (this slider providing a corresponding opening for its counterpart) can plunge. For this, opening 126K can be designed such that it houses at least, and preferably, exactly, half of the pot-shaped region which is provided for reception of spring 126G. Preferably, the sectional plane runs along the longitudinal axis of tension axle, since in this case, the forces are distributed more evenly than for a sectional plane which stands perpendicular on the longitudinal axis. So, metaphorically speaking, each locking slider 126B', 126A' has a "leg" 126J and an accordingly shaped opening 126K.

According to a not shown embodiment, each locking slider can have another number of "legs" 126J and corresponding openings 126K, e.g. two, three or four "legs" 126J and an according number of openings 126K. It is only essential that both locking sliders can be partially be inserted one into the other, wherein the "legs" 126J of one locking slider just move into the openings 126K of the other locking slider.

Figures 13, 14:
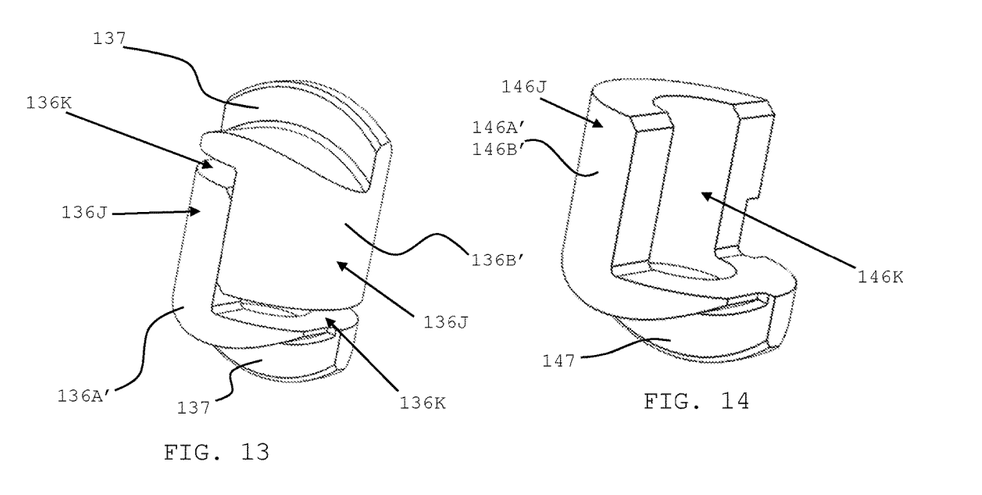
FIG. 13 shows a detail view of two locking sliders inserted one into the other.
FIG. 14 shows a detail view of one individual locking slider.

Details of two locking sliders 136A', 136B' inserted one into the other, each with one leg 136J and one opening 136K, can be seen in FIG. 13.

An individual locking slider 146A'/146B' is depicted in FIG. 14.

According to the embodiment which is shown in FIG. 12, locking sliders 126A', 126B' can be designed multi- such as in particular two-part, and they can be moveably supported in second end 125.

Locking sliders 126A', 126B' can be kept in the extended position by means of integrated springs, elastomers, or by means of inserted springs.

According to the embodiment of FIG. 3, the counter piece 38 has a cavity 38A in which the second end 35, together with the extended locking pawls 36A, 36B or extended locking sliders 126A', 126B' (see FIG. 12), can be accommodated, and wherein the cavity 38A has a taper, the latter providing a shoulder 38B for locking interaction with the extended locking pawls 36A, 36B or extended locking sliders 6A', 6B' (FIG. 12), respectively. Such a counter piece 58, 68 is shown in FIG. 5 and FIG. 6. It "grips over" second end 35 (FIG. 3), and is therefore axially "plugged" onto the same.

Such a counter piece 58, 68 can also be used with second end 75, 85, 95 or locking mechanisms, respectively, shown in FIGS. 7, 8 and 9, as well as FIGS. 10, 11 and 12.

Figure 15:
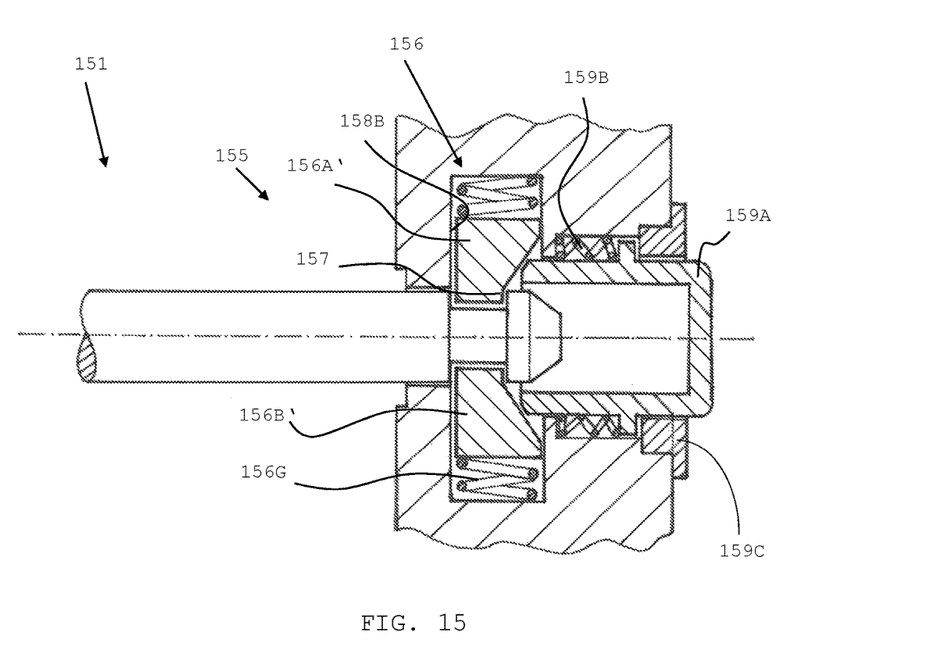
FIG. 15 shows a detail view of a cut through a further embodiment of a second end with counter piece.

According to another embodiment, locking sliders 156A', 156B' are arranged inside a dropout, and particularly preferred, they are moveable in radial direction. Such an embodiment is shown in FIG. 15.

According to this embodiment, counter piece is no individual body, but (at least partially) integrated into the dropout. The unlocking mechanism shown here has one end which points to the left in the drawing; this end cooperates with bevels of locking sliders 156A', 156B', so that these can be brought in an unlocking position upon axial movement of the unlocking mechanism 159A-C (shown is the locking position of locking sliders 156A', 156B'). Second clamping surface 157 is located at the second end 155 of tension axle 151, this end thus being part of the locking mechanism 156, and cooperating with locking sliders 156A', 156B', respectively.

According to this embodiment, counter piece is not plugged on; second end 155 is merely axially inserted into counter piece. Also axially inserted is second end 85 according to the embodiment shown in FIG. 8.

Also according to the embodiment shown in FIG. 8, the unlocking mechanism 89A-C has an end which points to the left in the picture; it cooperates with bevel of locking pawl 86A such that it can be brought in an unlocking position upon axial movement of the unlocking mechanism 89A-C.

Preferably, unlocking mechanism 89A-C has a front or inner surface pointing towards the first clamping surface, said front or inner surface being moveable in axial direction contrary to the first clamping surface and cooperating with bevels of the locking mechanism (such as in particular with locking pawl 86A), so that, upon axial motion of the front or inner surface, the locking mechanism increasingly deflects, such that it can eventually be unlocked. Such an unlocking mechanism is, inter alia, shown in FIG. 6 in the form of counter piece 68. In FIG. 1 and FIG. 3, the counter piece 18, 38 can be seen together with tension axle 11, 31.

Preferably, unlocking mechanism 19, 39 is designed as a sleeve-shaped push button 19A, 39A. Such a push-button 19A, 29A, 69A, 89A, 159A, is shown in FIGS. 1, 2, 6, 8 and 15. It is axially moveable, so that in can cooperate with the locking mechanism. Particularly preferred, unlocking mechanism 159A-C automatically returns in a resting position (shown in FIG. 15), in which it does not operate the locking mechanism (i.e. does not unlock it). For this, a spring 156G can be used for instance, which acts contrary to the unlocking direction (to the left in the picture).

Unlocking mechanism can thus be accommodated in a separate housing. The advantage of this embodiment is that counter piece and dropout are independent of each other. Further, counter piece can be easily exchanged when damaged.

According to another embodiment, exemplarily shown in FIG. 8 and FIG. 15, the unlocking mechanism can also be integrated in a dropout. Accordingly, the dropout can fulfill the function of counter piece. The shoulder 88B, 158B which is integrated in the dropout serves as abutment for locking pawl 86A or locking sliders 156A', 156B', respectively. The advantage of this embodiment is that it has a lower weight and a less obtrusive design of the construction. Also, the risk of injury as well as the air resistance are reduced because of the extensive incorporation of the unlocking mechanism into the dropout.

As shown, a quick clamping system according to the invention solves the problems known from the art. The quick clamping system can be operated in an easy and secure way; further, it is insusceptible to soiling, and it also reduces fabrication and assembling costs one hand, and provides lower weight on the other.

LIST OF REFERENCE NUMERALS tension axle 11, 21, 31, 41, 151
first end 12, 22, 32,
means for exerting axial compressive forces 23, 33, 33
first clamping surface 14, 24, 34,
second end 15, 25, 35, 45, 75, 85, 95, 125, 155
recess 85A, 95A
locking mechanism 16, 36, 156
locking pawl 16A, 16B, 26A, 26B, 76A, 76B, 86A, 96A, 96B
locking slider 36A', 36B', 46A', 46B', 106A', 106B', 106C', 116A', 116B', 116C', 12A', 12B', 136A', 136B', 146A', 146B', 156A', 156B'
fillet 76C"
bolt 76D
shoulder 76E
elastomer 16F
spring 36G, 46G, 126G, 156G
spring leaf 96G'
housing 36H, 46H, 126H
headless screws 46I
leg 126J, 136J, 146J
opening 126K
second clamping surface 17, 27, 37, 47, 77, 87, 97, 127, 157
counter piece 18, 38, 58, 68,
cavity 18A, 38A, 68A,
shoulder 18B, 28B, 38B, 48B, 58B, 68B, 88B, 158B
ring 18C, 38C, 58C
unlocking mechanism 19, 39
button 19A, 29A, 39A, 49A, 69A, 89A, 159A
collar 19C, 29C, 39C, 49C, 69C, 89C, 159C
spring 19B, 39B, 69B, 89B, 159B
tension rod 110, 210, 310
middle section 111, 211, 311, 411, 711
housing 113, 213, 313, 413, 513, 613,
spring 114, 214, 314,
connector 115, 215, 315
bolt 216, 316, 516
diameter 1D, 3D, 7D

What is claimed is:

1. A quick-clamping system for fixing a hub of a wheel between dropouts of a fork or chainstays of a bicycle, comprising:
a tension axle with a means for exerting axial compressive forces and a first clamping surface, both being arranged at a first end of the tension axle;
a locking mechanism having a second clamping surface and locking a second end of the tension axle against axial motion; and
a counter piece, wherein the counter piece and the second end can be detachably connected by means of axial plugging, and wherein the counter piece has an axially moveable, operable unlocking mechanism by means of which the locking mechanism can be unlocked, so that the counter piece and the second end can be detached from each other.

2. The quick-clamping system according to claim 1, wherein the locking mechanism comprises locking pawls.

3. The quick-clamping system according to claim 2, wherein the locking pawls laterally spring out of the second end and act in direction of the first clamping surface.

4. The quick-clamping system according to claim 3, wherein the locking pawls are fabricated integrally with the second end, or present in several parts and swivel-mounted in the second end, or fabricated as a continuous component.

5. The quick-clamping system according to claim 2, wherein the locking pawls or locking sliders are arranged inside a dropout.

6. The quick-clamping system according to claim 1, wherein the locking mechanism comprises locking sliders.

7. The quick-clamping system according to claim 6, wherein the locking sliders laterally move out of the second end and act in direction of the first clamping surface.

8. The quick-clamping system according to claim 7, having only two locking sliders.

9. The quick-clamping system according to claim 8, wherein the locking sliders have a pot-shaped basic shape and adjacent back sides that can be partially inserted into one another.

10. The quick-clamping system according to claim 7, having only three locking sliders.

11. The quick-clamping system according to claim 10, wherein the locking sliders have a pot-shaped basic shape and adjacent back sides that can be partially inserted one into the other.

12. The quick-clamping system according to claim 1, wherein the counter piece has a cavity in which the second end, together with the extended locking pawls or extended locking sliders, can be accommodated, and wherein the cavity is tapered to provide a shoulder for locking interaction with the extended locking pawls or extended locking sliders.

13. The quick-clamping system according to claim 1, wherein the unlocking mechanism has a front or inner surface pointing towards the first clamping surface, the front or inner surface being moveable in axial direction contrary to the first clamping surface and cooperating with bevels of the locking mechanism, so that, upon axial motion of the front or inner surface, the locking mechanism increasingly deflects, such that it can eventually be unlocked.

14. The quick-clamping system according to claim 13, wherein the unlocking mechanism is provided as a sleeve-shaped push button.

15. The quick-clamping system according to claim 1, wherein the unlocking mechanism is accommodated in a housing.

16. The quick-clamping system according to claim 1, wherein the unlocking mechanism is accommodated in the dropout.

17. The quick-clamping system according to claim 1, wherein the locking mechanism comprises locking pawls or locking sliders that are arranged inside a dropout.

\* \* \* \* \*